(12) United States Patent
Au et al.

(10) Patent No.: US 8,949,218 B2
(45) Date of Patent: Feb. 3, 2015

(54) TECHNIQUES FOR JOIN PROCESSING ON COLUMN PARTITIONED TABLES

(71) Applicants: Grace Kwan-On Au, Rancho Palos Verdes, CA (US); Mohammed Al-Kateb, Rolling Hills Estates, CA (US)

(72) Inventors: Grace Kwan-On Au, Rancho Palos Verdes, CA (US); Mohammed Al-Kateb, Rolling Hills Estates, CA (US)

(73) Assignee: Teradata US, Inc., Dayton, OH (US)

( * ) Notice: Subject to any disclaimer, the term of this patent is extended or adjusted under 35 U.S.C. 154(b) by 93 days.

(21) Appl. No.: 13/726,956

(22) Filed: Dec. 26, 2012

(65) Prior Publication Data

US 2014/0181076 A1     Jun. 26, 2014

(51) Int. Cl.
    G06F 17/00     (2006.01)
    G06F 17/30     (2006.01)

(52) U.S. Cl.
    CPC .............................. G06F 17/30498 (2013.01)
    USPC ........... 707/713; 707/722; 707/736; 707/758; 706/12; 706/14; 706/45

(58) Field of Classification Search
    None
    See application file for complete search history.

(56) References Cited

U.S. PATENT DOCUMENTS

| | | | |
|---|---|---|---|
| 5,548,758 A | 8/1996 | Pirahesh et al. | |
| 6,374,235 B1 | 4/2002 | Chen et al. | |
| 6,446,063 B1 | 9/2002 | Chen et al. | |
| 6,944,633 B1* | 9/2005 | Higa et al. | 1/1 |
| 7,203,686 B1* | 4/2007 | Sinclair et al. | 1/1 |
| 7,966,343 B2* | 6/2011 | Yang et al. | 707/791 |
| 8,396,865 B1* | 3/2013 | Ie et al. | 707/723 |
| 8,515,945 B2* | 8/2013 | Pendap et al. | 707/714 |
| 2003/0074348 A1* | 4/2003 | Sinclair et al. | 707/2 |
| 2004/0122845 A1* | 6/2004 | Lohman et al. | 707/102 |
| 2005/0091238 A1* | 4/2005 | Zane et al. | 707/100 |
| 2006/0253473 A1* | 11/2006 | Agrawal et al. | 707/100 |
| 2008/0263001 A1* | 10/2008 | Lohman et al. | 707/2 |
| 2009/0037365 A1* | 2/2009 | Sinclair et al. | 707/2 |
| 2009/0063527 A1* | 3/2009 | Corvinelli et al. | 707/101 |
| 2009/0254516 A1* | 10/2009 | Meiyyappan et al. | 707/2 |
| 2009/0254532 A1* | 10/2009 | Yang et al. | 707/4 |
| 2010/0088309 A1 | 4/2010 | Petculescu et al. | |
| 2011/0246432 A1* | 10/2011 | Yang et al. | 707/693 |
| 2012/0166400 A1* | 6/2012 | Sinclair et al. | 707/692 |
| 2012/0166402 A1* | 6/2012 | Pederson et al. | 707/692 |
| 2012/0311709 A1* | 12/2012 | Kang et al. | 726/24 |
| 2013/0173592 A1* | 7/2013 | Yuan et al. | 707/719 |
| 2014/0006380 A1* | 1/2014 | Arndt et al. | 707/714 |
| 2014/0172898 A1* | 6/2014 | Aguilera et al. | 707/759 |

\* cited by examiner

*Primary Examiner* — Hung Le
(74) *Attorney, Agent, or Firm* — Schwegman, Lundberg & Woessner P.A.

(57) ABSTRACT

Techniques for processing joins on column partitioned tables are provided. A join operation having a column partitioned table within a query is decomposed into a two-step process. The first process performs the join condition on the column portioned table with optional filtering conditions and a non-column partitioned table and spools the resulting columns to a spooled table. The spooled table is then rowid joined back to the column partitioned table to acquire remaining columns not present in the spooled table. Both the first and second steps can be separately resolved for costs when determining a query execution plan.

17 Claims, 3 Drawing Sheets

TECHNIQUES FOR JOIN PROCESSING ON COLUMN PARTITIONED TABLES

BACKGROUND

A database join operation combines records from more than one database table. A join essentially creates a set that can be saved as its own independent database table. There are a variety of types of joins.

One type of join is called an outer join. An outer join does not require each record in the two joined tables to have a corresponding matching record. The resulting joined table retains each record, even if no other matching record exists. Outer joins may be subdivide further into left outer joins, right outer joins, and full outer joins, depending on which table(s) the rows are retained from, such as left, right, or both. A left outer join retains all records from the left table regardless of matching and retains only matching records from a right table. Conversely, a right outer join retains all records from a right table regardless of matching and retains only matching records from the left table. A full outer join includes records from both the left and right tables regardless of matching.

Another type of join is the inner join. An inner join creates a common results table from two tables by combining common values from the two tables via a join predicate.

Traditionally, databases have been partitioned based on rows (sometimes referred to as "horizontal partitioning"). However, recently databases have permitted partitioning based on columns (also referred to as "vertical partitioning").

Vertical partitioning for database tables and join indexes is a powerful physical database design choice that has only recently been made available in the industry. A key advantage of column partitioning is to reduce the Input/Output (I/O) cost of the underlying database objects by eliminating unnecessary access to columns that are not referenced in a given query in the projection list, join conditions, and/or elsewhere.

Since joining column partitioned ("column partition" is herein referred to as "CP") objects usually is a dominate factor on the cost of answering a given query, optimizing join processing over CP objects is crucial to the query performance.

Join processing on a column-partitioned table for a parallel system can be done by duplicating or redistributing the other table on every Access Module Processor (AMP); by duplicating; or redistributing the column-partitioned table across all the AMPs. If the other table is duplicated, the column-partitioned table can be directly accessed in the join operation, in which case, the join columns in the column-partitioned table are accessed first to evaluate the join conditions. The remaining columns are accessed only for rows that satisfy the join conditions. Therefore for a join that qualifies a relatively small number of rows, duplicating the other table to directly join with the column-partitioned table can also achieve good Input/Output (I/O) reduction. However, when the other table is too large to be duplicated, the column-partitioned table will need to be duplicated or redistributed into a spool file to do the join. Conventionally, any time it is necessary to spool a column-partitioned table for a join operation, all the columns that are referenced by a given query are read and output to a spool file. This incurs un-necessary I/O in reading the non-join columns for rows that are not going to qualify for the join conditions, which is inefficient.

Moreover, large scale databases include query optimizers (may also be referred to as "database optimizers") that determine a most efficient way to execute a query by considering multiple different query plans and the cost of each individual query plan. However, because conventional row-based database systems generally process joins with the assumption that there is very little overhead to access columns within a row once a row has been read, column-level options are not used by query optimizers in making query plan decisions for joins on CP tables.

SUMMARY

In various embodiments, techniques for join processing on column partitioned tables are presented. According to an embodiment, a method for join processing on column partitions of a database is provided.

Specifically, a query is received having a join operation on a column partitioned (CP) table and a non-CP table. Next, a join condition is processed for the join operation to produce intermediate joined rows that satisfy the join condition. The intermediate joined rows together with the row identifiers for logical rows in the CP table that satisfy the join condition are saved in a rowid spooled table. Finally, a rowid join is performed from the rowid spooled table to the CP table to acquire remaining columns of the CP table based on the row identifiers in the rowid spooled table.

DETAILED DESCRIPTION

Figure 1:
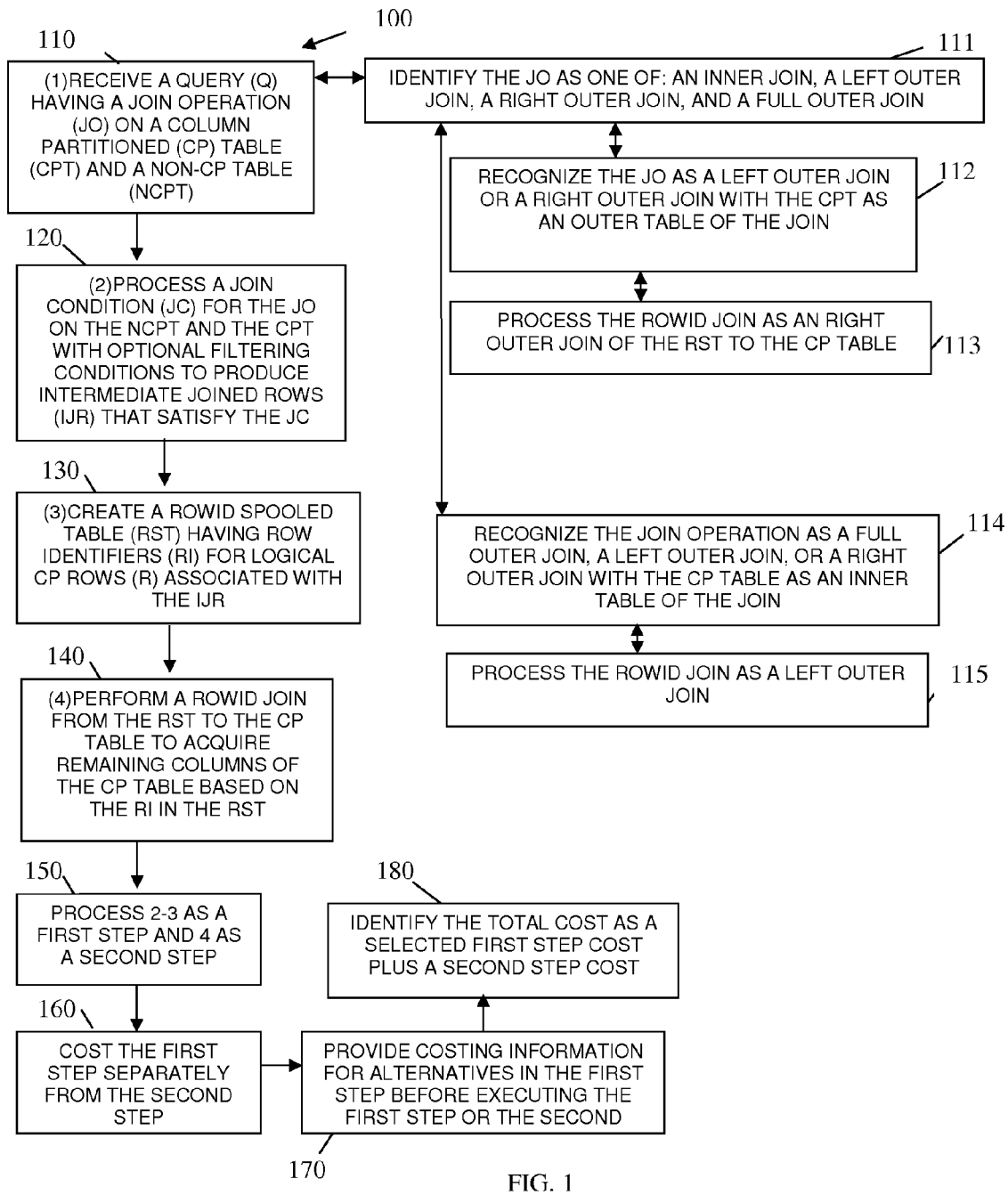
FIG. 1 is diagrams of a method for join processing over column partitions of a CP table, according to an example embodiment.

FIG. 1 is diagrams of a method 100 for join processing over column partitions of a CP table, according to an example embodiment. The method 100 (hereinafter "join manager") resides and/or is programmed within memory and/or a non-transitory computer-readable storage medium as executable instructions. The instructions are executed on one or more processors of a network and the network can be wired, wireless, or a combination of wired and wireless.

Before discussing the processing of the join manager some initial embodiments and an example illustrating how a conventional query is processed for column partitioned data is presented, followed by how such a query is then processed with the new and novel techniques presented herein and below.

A two-step CP join is considered for joining with a column-partitioned (CP) table when after applying single-table conditions and join conditions, a different set of column partitions have to be accessed to build the result rows. The first step performs the join between the CP table and the other table. In this join, only the single-table condition columns and join columns are accessed. The result of the first step is a rowid spool, which contains the rowid of the qualified CP rows. The second step is a rowid join from the rowid spool to the CP table accessing the remaining columns.

Consider a CP table Orders and a table Lineitems (not CP) defined as below:

---

CREATE TABLE Orders
    (Order# INTEGER, Item# INTEGER, Spec_Inst VARCHAR

-continued

```
(1000))NO PRIMARY INDEX PARTITION BY COLUMN;
CREATE TABLE Lineitems
    (Item# INTEGER, Description VARCHAR (1000), Price
    DECIMAL(10,2))PRIMARY INDEX(Item#);
``` and the following query:

```
sel O.Order#, O.Item#, O.Spec_Inst, L.Price from Orders AS O,
Lineitems AS L
    where L.Price > 100 and O.Item#=L.Item#;
```

With the discussed two-step CP join process, the join between the CP Orders table and Lineitems table in the above query is done in two steps which can be represented using following SQL statements:

```
Step 1:
    insert into RowidSpool (rowid, Item#, Price)
        sel O.rowid, O.Item#, L.Price from Orders AS O, Lineitems AS
        L
            where L.Prices > 1000 and O.Item#=L.Item#;
Step 2:
    sel O.Order#, RS.item#, O.Spec_Inst, RS.Price from Orders AS O,
    RowidSpool AS RS
        where RS.rowid = O.rowid;
```

The join plan with the lowest cost is picked to do the join in the first step. For this example, one possible optimal plan is to spool the rowid and Item# columns from Orders table, then redistribute and sort the spool for a merge join with Lineitems table. Note that the rowid is not stored in its own column partition; it is stored along with the column values in every CP. Therefore, only the Item# CP is read in preparing the spool to join with Lineitems. The result of CP Orders table and Lineitems table join operation is saved in a RowidSpool. In the second step, the RowidSpool is redistributed to directly join with the Orders table using a row id join accessing the Order# CP and Spec_Inst CP. Since these two partitions are read only for those rows that qualify for the first join, the two-step CP join mechanism incurs less I/O on the Orders table than a one-step join technique that reads and spools all the three column partitions for every Orders row to join with Lineitems. The two-step CP join mechanism also gets performance benefits from the first step having a smaller spool for the join.

Planning and Costing of the Two-Step CP Join Processing

Planning and costing of a two-step CP join is done by a new Handle_CPJoin function in the binary join planner of a query optimizer. The following is a high level description of Handle_CPJoin:

1) Determine the number of rows in CPRelat (CP Table) that qualify the join conditions. Call this MatchedRows.
2) Build CPAccessInfo (CP Access Information) for the columns that are needed for the first join and compute the cost of reading the corresponding CP's for the total number of rows in CPRelat. The CPAccessInfo and access cost are saved in CPInfo4JoinStep1.
3) Build CPAccessInfo for the remaining columns that are accessed in the second join step and compute the cost of reading the corresponding CP's for the number of MatchedRows in CPRelat. The CPAccessInfo and access cost are saved in CPInfo4RowIDJ.
4) Determine the join type of the two steps: call these FirstStepJoinType and SecondStepJoinType, respectively.

a) For an inner join, both the first and the second step are done as an inner join.
b) For a left outer join or a right outer join for which the CP table is the outer table (i.e. left table of a left outer join or a right table of a right outer join) the first step is done using an inner join so the rowid spool resulted from the first step includes only the matching records. In the second step, the rowid spool is right outer joined back to the CP table for the remaining columns. A right outer join is used for the join back so the join result has both matching and non-matching records.
c) For a full outer join; or left or right outer join for which the CP table is the inner table (i.e., a right table or a left outer join or a left table of a right outer join) the first step is done using the full, left, or right outer join so the rowid spool resulted from the first step includes both the matching and non-matching records. In the second step, the rowid spool is left outer joined back to the CP table for the remaining columns. A left outer join is used for the join back so the non-matching records from the rowid spool are retained in the join result.
5) Use CPInfo4JoinStep1 to adjust costing parameters such as row size and access cost in CPRelat. Then, invoke binary join planner to plan the join between CPRelat and the other Relat using FirstStepJoinType. Call this CPJPlan with a cost of CPJoinCost.
   Binary join planner will choose the join plan with the lowest cost for this join based on the adjusted costing parameters in CPRelat. This opens up join options that may not be cost effective for a regular one-step join. Specifically, the option of duplicating only the join columns from CPRelat to directly join with the other Relat can now be an optimal plan.
6) Use CPInfo4RowIDJ to plan the join back from the rowid spool to CPRelat, call this RowIDJPlan with a cost of RowIDJCost.
   Binary join planner recognizes a rowid binding to the CPRelat from the rowid spool and plans the join as a rowid join with SecondStepJoinType as the join type. Because the rowid join requires the base table to be the right table, position of the CPRelat, which is in the left of a left outer join is switched and the left outer join is switched to a right outer join; and position of the CPRelat, which is in the left of a right outer join is switched and the right outer join is switched to a left outer join.
7) Compute the total cost of two-step CP join as:

$$TotalCPJoinCost = CPJoinCost + RowIDJCost.$$

The two-step CP join is picked if TotalCPJoinCost is lower than the cost of all other non-two-step CP joins. CPInfo4JoinStep1 and CPInfo4RowIDJ that are created from steps 2 and 3 are saved in the CPJPlan from step 4. A 2StepCPJoin flag is set in CPJPlan to indicate that a rowid join is needed following the first CP join. CPJPlan now describes a complete two-step CP join plan.

The two-step CP join processing improves the performance of joining with a CP table on a parallel database system.

With respect to outer joins, consider the CP Order Table and the non-CP Lineitem table that were given earlier and the following query:

```
Explain select
    O.Order#,O.Item#,O.Spec_Inst.L.Price
```

-continued

> From Orders AS O LEFT OUTER JOIN Lineitems AS L
> ON L.Price > 100 and O.Item#=L.Item#;

Explanation of Conventional Process, which produces the following query using the process described:
1) First, lock a distinct TWOSTEPJOIN."pseudo table" for read on a RowHash to prevent global deadlock for TWOSTEPJOIN.L.
2) Next, lock a distinct TWOSTEPJOIN."pseudo table" for read on a RowHash to prevent global deadlock for TWOSTEPJOIN.O.
3) Lock TWOSTEPJOIN.L for read, and lock TWOSTEPJOIN.O for read.
4) Execute the following steps in parallel.
   1) Do an all-AMPs RETRIEVE step from TWOSTEPJOIN.L by way of an all-rows scan with a condition of ("TWOSTEPJOIN.L.Price>100.00") into Spool 2 (all_amps), which is duplicated on all AMPs. Then do a SORT to order Spool 2 by the hash code of (TWOSTEPJOIN.L.Item#). The result spool file will not be cached in memory. The size of Spool 2 is estimated with no confidence to be 6,666,668 rows (166,666,700 bytes). The estimated time for this step is 5 minutes and 3 seconds.
   2) Do an all-AMPs RETRIEVE step from 4 column partitions of TWOSTEPJOIN.O into Spool 3 (all_amps), which is built locally on the AMPs. Then we do a SORT to order Spool 3 by the hash code of (TWOSTEPJOIN.O.Item#). The result spool file will not be cached in memory. The size of Spool 3 is estimated with high confidence to be 10,000,000 rows (3,560,000,000 bytes). The estimated time for this step is 25 minutes and 58 seconds.
5) Do an all-AMPs JOIN step from Spool 2 (Last Use) by way of a RowHash match scan, which is joined to Spool 3 (Last Use) by way of a RowHash match scan. Spool 2 and Spool 3 are right outer joined using a merge join, with condition(s) used for non-matching on right table ("NOT (Item# IS NULL)"), with a join condition of ("Item#=Item#"). The result goes into Spool 1 (group_amps), which is built locally on the AMPs. The result spool file will not be cached in memory. The size of Spool 1 is estimated with no confidence to be 16,666,666 rows (17,583,332,630 bytes). The estimated time for this step is 14 minutes and 51 seconds.
6) Finally, send out an END TRANSACTION step to all AMPs involved in processing the request.

The contents of Spool 1 are sent back to the user as the result of statement 1. The total estimated time is 40 minutes and 49 seconds.

The above plan retrieves all columns in the Orders table that are referenced by the query, namely, Order#, Item# and Spec_Inst into a Spool 2. Similarly, all columns in the Lineitems table that are referenced by the query are retrieved into a Spool 3, which is duplicated onto all AMPs. Spool 2 and Spool 3 are then joined. Since both tables have a large number of records, creation of Spool 2 and Spool 3 can take a long time.

The techniques herein allow the optimizer to consider a two-step (2-step) join between Order table and Lineitem table. The solution results in the following rewritten for the same aforementioned query.

> Explain select
> O.Order#, O.Item#, O.Spec_Inst, L.Price
> from Orders AS O LEFT OUTER JOIN Lineitems AS L
> ON L.Price > 100 and O.Item#=L.Item#;

Explanation
1) First, lock a distinct TWOSTEPJOIN."pseudo table" for read on a RowHash to prevent global deadlock for TWOSTEPJOIN.L.
2) Next, lock a distinct TWOSTEPJOIN."pseudo table" for read on a RowHash to prevent global deadlock for TWOSTEPJOIN.O.
3) Lock TWOSTEPJOIN.L for read, and we lock TWOSTEPJOIN.O for read.
4) Do an all-AMPs RETRIEVE step from 2 column partitions of TWOSTEPJOIN.O into Spool 2 (all_amps), which is redistributed by the hash code of (TWOSTEPJOIN.O.Item#) to all AMPs. Then do a SORT to order Spool 2 by row hash. The result spool file will not be cached in memory. The size of Spool 2 is estimated with high confidence to be 10,000,000 rows (220,000,000 bytes). The estimated time for this step is 1 minute and 31 seconds.
5) Do an all-AMPs JOIN step from TWOSTEPJOIN.L by way of a RowHash match scan with a condition of ("TWOSTEPJOIN.L.Price>100.00"), which is joined to Spool 2 (Last Use) by way of a RowHash match scan. TWOSTEPJOIN.L and Spool 2 are inner joined using a merge join with a join condition of ("Item#=TWOSTEPJOIN.L.Item#"). The input table TWOSTEPJOIN.L will not be cached in memory. The result goes into Spool 3 (all_amps), which is redistributed by the hash code of (TWOSTEPJOIN.O.ROWID) to all AMPs. Then do a SORT to order Spool 3 by the sort key in spool field1. The result spool file will not be cached in memory. The size of Spool 3 is estimated with no confidence to be 16,666,666 rows (583,333,310 bytes).
6) Do an all-AMPs JOIN step from Spool 3 (Last Use) by way of an all-rows scan, which is joined to 2 column partitions of TWOSTEPJOIN.O. Spool 3 and TWOSTEPJOIN.O are right outer joined using a row id join, with a join condition of ("(1=1)"). The input table TWOSTEPJOIN.O will not be cached in memory. The result goes into Spool 1 (group_amps), which is built locally on the AMPs. The result spool file will not be cached in memory. The size of Spool 1 is estimated with no confidence to be 16,666,666 rows (17,583,332,630 bytes). The estimated time for this step is 44 minutes and 22 seconds.
7) Finally, send out an END TRANSACTION step to all AMPs involved in processing the request.

The contents of Spool 1 are sent back to the user as the result of statement 1.

The above plan does the first join by redistributing the column Item# from Orders table to join directly with the Lineitems table to produce a rowid spool (Spool 3). Spool 3 is redistributed on ROWID and directly right outer joined to Orders table using row id join.

The following in the newly generated plan is observed. First, the new plan does not spool the Lineitems table for the first join. Second, the second join step is a rowid join which is a very efficient join because a rowid can be used to locate the containing physical row directly. Third, because rowid join requires the base relation to be the right relation, the left outer join has been switched to right outer join.

The presented techniques can also have a considerable performance improvement for queries with left and right outer joins over CP tables on rowid alone.

Now referring to the FIG. 1 and the join manager.

At 110, the join manager receives a query having a join operation on a column partitioned (CP) table and a non-CP table. The entire join manager may be embedded in a query optimizer or may be an external service to the query optimizer or part of the search logic for a database system, such that receipt of the query and scanning the query for the join operation on the CP table and non-CP table is not an issue. Other techniques for scanning and recognizing portions of the query may be used as well in other embodiments.

According to an embodiment, at 111, the join manager identifies the join operation as one of: an inner join, a left outer join, a right outer join, and/or a full outer join.

Continuing with the embodiment for 111 and at 112, the join manager recognizes the join operation as a left outer join, or a right outer join with the CP table as an outer table of the join being performed.

Continuing with the embodiment of 112 and at 113, the join manager processes the rowid join as a right outer join of the rowid spooled table to the CP table.

In a different case, at 114, the join manager recognizes the join operation as a full outer join, a left outer join, or a right outer join with the CP table as the inner join of the join.

Continuing with 114 and at 115, the join manager processes the rowid join as a left outer join.

At 120, the join manager processes a join condition for the join operation on the non-CP table and the CP table with optional filtering to produce intermediate joined rows that satisfy the join condition. This was discussed above in detail and sample SQL for a sample scenario was provided.

At 130, the join manager creates a rowid spooled table having row identifiers for logical CP rows that are associated with the intermediate joined rows. Again, this was discussed and an example was provided in detail above.

At 140, the join manager performs a rowid join from the rowid spooled table to the CP table to acquire remaining columns of the CP table based on the row identifiers of the rowid spooled table. So, the columns not subject to the join condition are rowid joined back in to the results for the join.

According to an embodiment, at 150, the join manager processes 120-130 as a first step and 140 as a second step. So, in the first step column partitions are identified for the processing at 120-130 and in the second step other column partitions are identified for the processing at 140.

Continuing with the embodiment of 150 and at 160, the join manager costs the first step separately from the second step.

Continuing with the embodiment of 160 and at 170, the join manager provides costing information for alternatives to the first step before executing the first step or the second step.

Still continuing with the embodiment of 170 and at 180, the join manager identifies the total cost as a selected first step cost plus a second step cost.

Again, the join manager can be integrated into an optimizer or can be provided the above information from an optimizer or even provide the above information to an optimizer.

Figure 2:
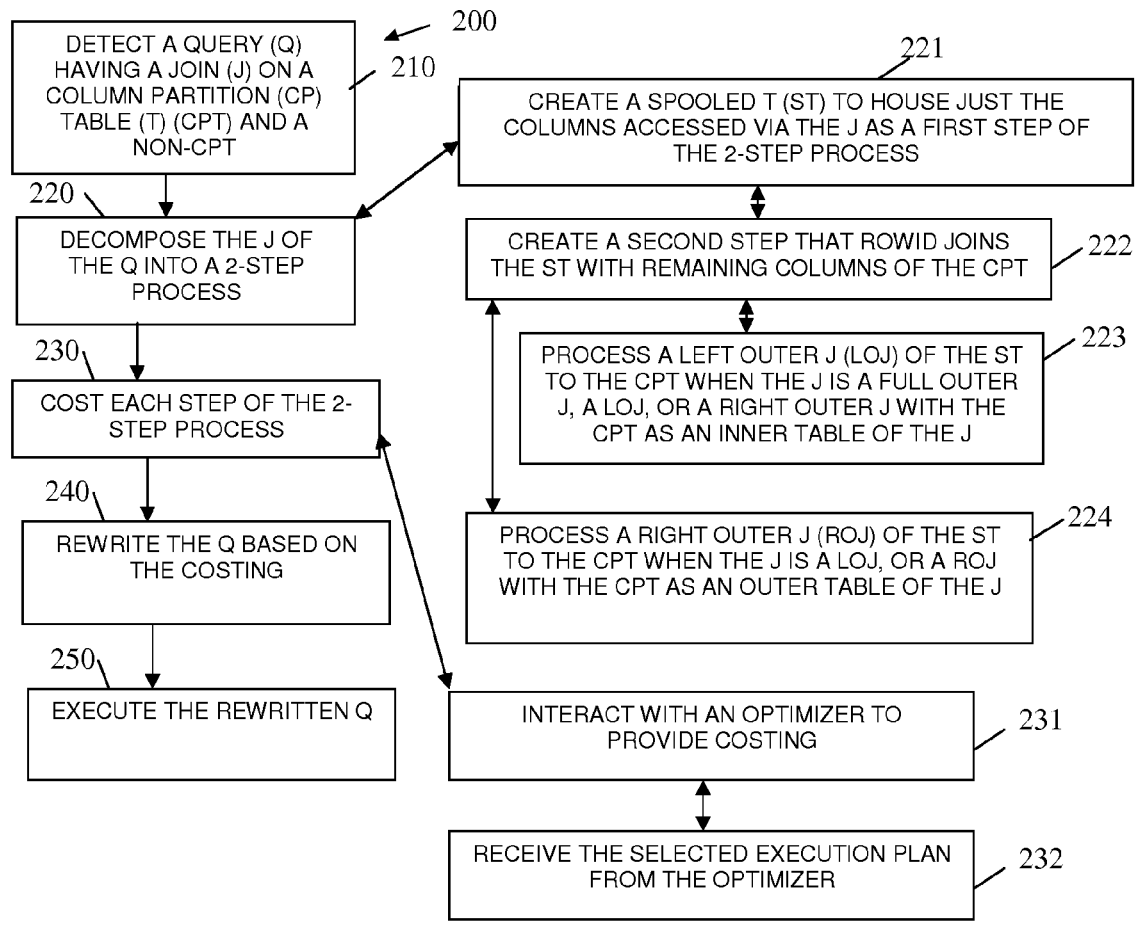
FIG. 2 is diagrams of another method for join processing over column partitions of a CP table, according to an example embodiment.

FIG. 2 is diagrams of another method 200 for join processing over column partitions of a database, according to an example embodiment. The method 200 (hereinafter referred to as "join controller") is implemented, resides, and is programmed within memory and/or a non-transitory computer-readable storage medium as executable instructions. The instructions are processed on one or more processors of the network and the network is wired, wireless, or a combination of wired and wireless.

The join controller presents another and in some cases enhanced perspective of the join manager represented by the FIG. 1.

At 210, the join controller detects a query having a join on a CP table and a non-CP table. This is similar to what was discussed above in detail with the FIG. 1.

At 220, the join controller decomposes the join of the query into a two-step process.

According to an embodiment, at 221, the join controller creates a spooled table to house just the columns accessed via the join as a first step of the two-step process.

Continuing with the embodiment of 221 and at 222, the join controller creates a second step that rowid joins the spooled table with remaining columns of the CP table.

Still continuing with the embodiment of 222 and at 223, the join controller processes a left outer join of the spooled table to the CP table when the join is a full outer join, a left outer join, or a right outer join with the CP table as the inner table of the join.

Still continuing with the embodiment of 222 and at 224, the join controller processes a right outer join of the spooled table to the CP table when the join is a left outer join, or a right outer join with the CP table as an outer table of the join.

At 230, the join controller costs each step of the two-step process.

In an embodiment, at 231, the join controller interacts with an optimizer to providing costing.

Continuing with the embodiment of 231 and at 232, the join controller receives the selected execution plan from the optimizer.

At 240, the join controller rewrites the query based on the costing.

In an embodiment, at 250, the join controller executes the query using the modified query.

Figure 3:
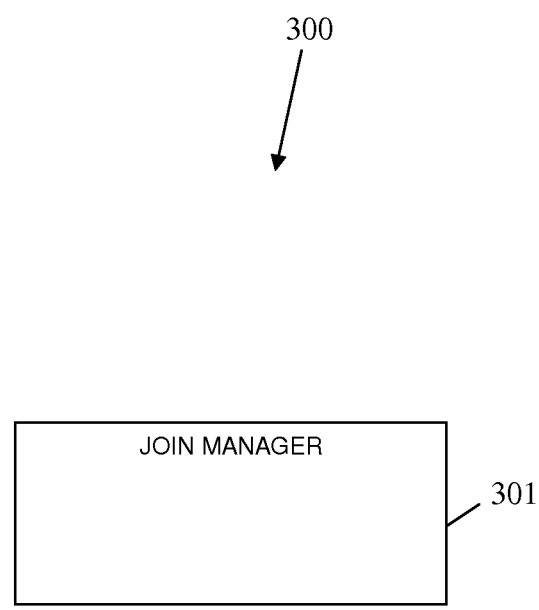
FIG. 3 is a diagram of a column partition join processing system, according to an example embodiment.

FIG. 3 is a diagram of a column partition join processing system 300, according to an example embodiment. Components of the column partition join processing system 300 are implemented and programmed within memory and/or non-transitory computer-readable medium and executed by one or more processors of a network, and the network is wired, wireless, or a combination of wired and wireless.

The column partition join processing system 300 includes a join manager 301.

The one or more processors of the column partition join processing system 300 include memory having the join manager 301. The one or more processors execute the join manager 301. Example processing associated with the join manager 301 was presented above in detail with reference to the FIGS. 1 and 2, respectively.

The join manager 301 is configured to decompose a join operation on a column partition (CP) table and a non-CP table in a query into a two-step process and permit each step to have resolved costs for selecting a query execution plan for the query. One appreciates that this was not possible with conventional approaches that handle join processing with column partitioned data.

According to an embodiment the join manager 301 is configured to provide the two-step process to an optimizer to provide back the costs and the selected query execution plan.

In still another case, the join manager 301 is configured to provide a first step that performs a join on the CP table and the non-CP table retaining just columns accessed by the join, and the join manager 301 is configured to provide a second step that rowid joins the intermediate joined rows from the first step to remaining columns in the CP table.

Continuing with the previous embodiment, the rowid join is a left outer join on the CP table when the join is a full outer join, a left outer join, or a right outer join with the CP table as an inner join table of the join.

Continuing with the previous embodiment, the rowid join is a right outer join on the CP table when the join is a left outer join, or a right outer join with the CP table as an outer join table of the join.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method processed by one or more processors, the method comprising the steps of:
   (1) receiving, via the processor, a query having a join operation on a column partitioned (CP) table and a non-CP table;
   (2) processing, via the processor, a join condition for the join operation on the non-CP table and the CP table with optional filtering to produce intermediate joined rows that satisfy the join condition;
   (3) creating, via the processor, a rowid spooled table having row identifiers for logical CP rows that are associated with the intermediate joined rows; and
   (4) performing, via the processor, a rowid join from the rowid spooled table to the CP table to acquire remaining columns of the CP table based on the row identifiers in the rowid spooled table.

2. The method of claim 1 further comprising, identifying, via the processor, column partitions for processing in (2) and (3) as a first step and identifying other column partitions for processing in (4) as a second step.

3. The method of claim 2, wherein processing further includes costing the first step separately from the second step.

4. The method of claim 3, wherein costing further includes providing costing information for alternatives in the first step before executing the first step or the second step.

5. The method of claim 4, wherein providing further includes identifying the total cost as a selected first step cost plus a second step cost.

6. The method of claim 1, wherein receiving further includes identifying the join operation as one of: an inner join, a left outer join, a right outer join, and a full outer join.

7. The method of claim 6, wherein identifying further includes recognizing the join operation as a full outer join, a left outer join, or a right outer join with the CP table as the inner table of the join.

8. The method of claim 7, wherein performing further includes processing the rowid join as a left outer join of the rowid spooled table to the CP table.

9. The method of claim 6, wherein identifying further includes recognizing the join operation as a left outer join, or a right outer join with the CP table as an outer table of the join.

10. The method of claim 9, wherein performing further includes processing the rowid join as a right outer join of the rowid spooled table to the CP table.

11. A method processed by a processor, the method comprising the steps of:
   detecting, via the processor, a query having a join on a column partition (CP) table and a non-CP table;
   decomposing, via the processor, the join of the query into a two-step process, wherein decomposing includes creating a spooled table to house just columns accessed via the join as a first step of the two-step process;
   costing, via the processor, each step of the two-step process; and
   rewriting, via the processor, the query based on the costing; and
   executing, via the processor, the rewritten query.

12. The method of claim 11, wherein decomposing further includes creating a second step that rowid joins the spooled table with remaining columns of the CP table.

13. The method of claim 12, wherein creating a second step includes processing a left outer join of the spooled table to the CP table when the join is a full outer join, a left outer join, or a right outer join with the CP table as an inner table of the join.

14. The method of claim 11, wherein costing further includes interacting with an optimizer to provide costing.

15. The method of claim 14, wherein selecting further includes receiving the selected execution plan from the optimizer.

16. A system, comprising:
   memory configured with a join manager that executes on a processor;
   wherein the join manager is configured to decompose a join operation on a column partition (CP) table and a non-CP table in a query into a two-step process and permit each step to have resolved costs for selecting a query execution plan for the query;
   wherein the join manager provides the two-step process to an optimizer to provide back the costs and the selected query execution plan; and
   wherein the join manager is configured to provide a first step that performs a join on the CP table and the non-CP table retaining just columns accessed by the join, and the join manager is configured to provide a second step that rowid joins the intermediate joined rows from the first step to remaining columns in the CP table.

17. The system of claim 16, wherein the rowed join is a left outer join on the CP table when the join is a full outer join, a left outer join, or a right outer join with the CP table as an inner table of the join.

* * * * *